June 21, 1960  R. W. FRYKMAN  2,941,444
ABSORPTION SPECTROMETRY APPARATUS
Filed Aug. 8, 1955
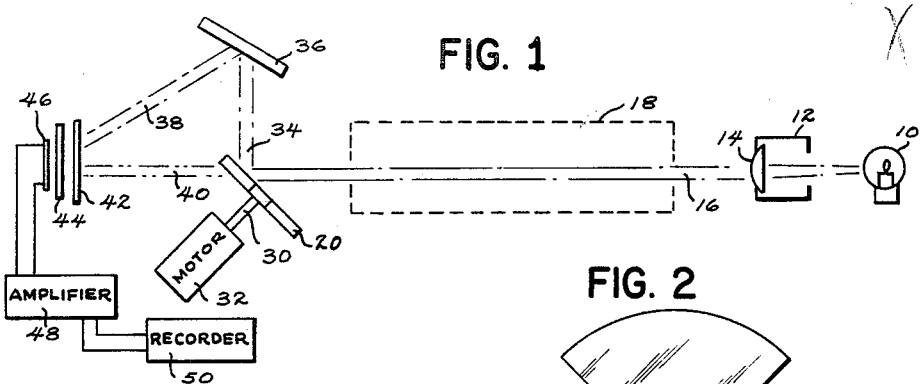
FIG. 1
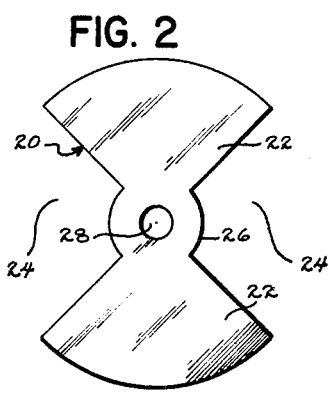
FIG. 2
FIG. 3
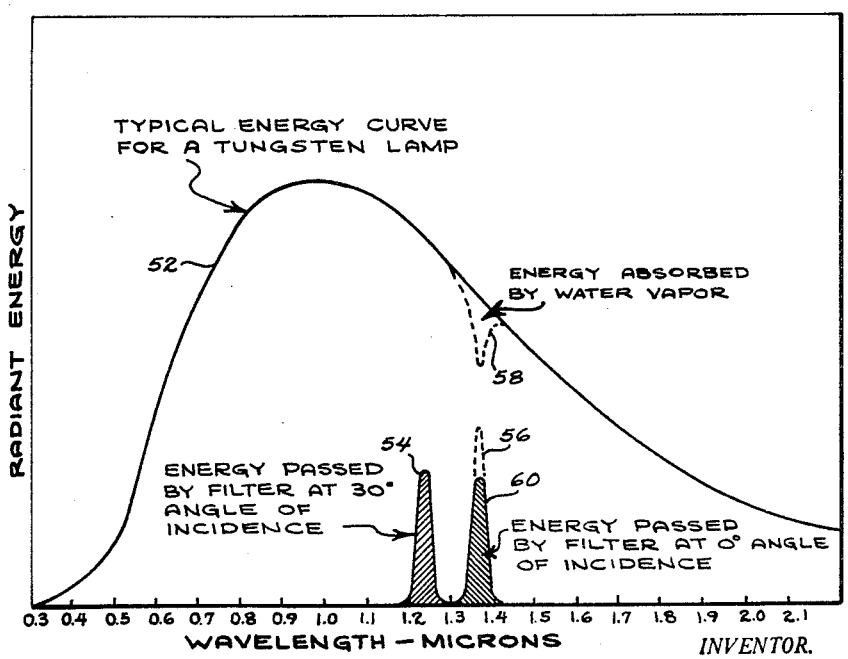
INVENTOR.
ROBERT W. FRYKMAN
BY
Stuart R. Peterson
ATTORNEY

United States Patent Office 2,941,444
Patented June 21, 1960

2,941,444

ABSORPTION SPECTROMETRY APPARATUS

Robert W. Frykman, Minneapolis, Minn., assignor to General Mills, Inc., a corporation of Delaware Filed Aug. 8, 1955, Ser. No. 526,832

3 Claims. (Cl. 88—14)

This invention relates generally to apparatus for analyzing fluid media by the use of radiation energy directed therethrough.

One object of the invention is to provide apparatus for determining characteristics of fluid media which will be exceedingly simple and susceptible to economical use. In this regard, it is within the purview of the invention to employ only a unitary stationary transmission type interference band-pass light filter composed of a plurality of filter layers, thus avoiding the necessity for a sector wheel composed of a number of such filters or other mechanical arrangements wherein a filter is moved relative to a beam of radiant energy.

Another feature of the invention resides in the versatility flowing from the use of a single stationary filter which may be easily and quickly interchanged with other filters. In this regard, not only is the mounting of the filter simplified but if desired a succession of different filters may be readily resorted to so as to determine various characteristics of either a single fluid undergoing analysis or a number of fluids to be tested in rapid order.

A further object of the invention is to derive an easy adjustment of the band-pass wavelength in many situations, without having to change filters, this being possible by merely varying the angles of incidence which the infrared beam takes in striking the filter unit.

Another object of the invention is to obviate any need for "wobbling" a filter so as to obtain different angles of incidence, thereby simplifying the mounting of the detector and concomitantly feeding to said detector a maximum of filtered energy.

A still further object of the invention is to provide an instrument of the foregoing character which may be made compact and portable in nature where demanded by the type of use to which the instrument is to be put.

Other objects will be in part obvious, and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

Figure 1 is a schematic representation illustrating the optical and mechanical orientation of certain basic components utilized in practicing the invention;

Fig. 2 is a detail of a rotatable segmented mirror utilized in the system depicted in Fig. 1; and Fig. 3 is a typical energy curve for a tungsten filament lamp, such lamp being suitable for emitting infra-red ray energy having appropriate spectral attributes.

While the invention may find utility in a rather wide field of application where absorption characteristics are to be determined in various gases, nonetheless in the present instance the description will be confined to a system and method relating to absolute humidity determination. Therefore attention is directed at this time to Fig. 1 where sufficient apparatus has been schematically portrayed which will permit the user to determine absolute humidity according to the principles underlying this invention.

In Fig. 1, it will be observed that an infra-red ray source 10, suggestively in the form of a tungsten filament lamp, is disposed adjacent to an optical device 12 for collimating a portion of the energy emitted by the source 10 into a beam of parallel rays, the collimating taking place through a plano-convex lens 14. The collimated beam has been designated by means of dashed lines 16. This beam 16 is passed, in the present instance, through an atmospheric sample which may be introduced into a structure or cell labelled 18. However, it will be appreciated that the structure 18 may in many instances be wholly dispensed with, for in humidity sensing it is only a sample of air that is to be analyzed and this sample may, if desired, constitute a rather large amount of air in order to obtain a reliable humidity average. In this regard, it will be appreciated that the larger the sample, the less chance there is for deviation as far as any particular portions of such sample are concerned.

At any rate, the beam 16 traverses a straight line path through the sample. Positioned for impingement upon by this beam is a rotatable segmented mirror 20. In the mirror construction pictured in Fig. 2 it will be observed that this mirror is equipped with oppositely projecting segments 22 having reflective surfaces. The segments as illustrated are quadrant ones, leaving intermediate angular spaces or openings designated by the numeral 24 through which radiant energy can pass without interference. At the hub 26 of the mirror 20 is located a mounting aperture 28 by which the mirror may be easily attached to a shaft 30 of a synchronous motor 32. While in no way limited to any specific number of revolutions per minute, the motor 32 is preferably an 1800 r.p.m. motor so that 60 cycle per second pulses will be transmitted in the illustrated situation, all in a manner hereinafter clarified. It is to be noted at this time, however, that the axis of the motor 32 about which the mirror 20 rotates is at an angle with respect to the beam 16.

By disposing the mirror 20 at an angle with respect to the beam 16, it follows that whenever either of the reflective segments 22 is moved into the path of the beam, a reflected pulse is produced, the cumulative effect of which produces a reflected beam indicated by the numeral 34. This beam, of course, is directed to one side. The reflected beam, actually pulses or flashes as explained immediately above, impinges upon a stationary mirror 36, and these pulses or flashes are in turn reflected at an angle both to the original beam 16 and the reflected beam 34, this latter beam bearing the reference numeral 38. However, the beam 16 when not interrupted by either of the two segments follows a straight course and the pulses or flashes so permitted to proceed have been given the reference numeral 40.

Both the beam pulses 38 and 40 which are produced in rapid succession are directed onto a transmission type interference band-pass light filter 42. This light filter 42 is a multi-layer interference one selected so that it has a center of transmission located at a wavelength of substantially 1.38 microns. Fortuitously, however, the wavelength of a band-pass filter of this type decreases as the angle of incidence increases. By virtue of this fact the beam pulses 38, caused to strike the planar filter at an angle, can be made to pass through the filter only when of a certain wavelength governed by the magnitude of such angle. With the multi-layer type of filter selected so as to have a center of transmission approximating 1.38 microns, it has been found that by utilizing an angle of incidence of about 30°, the incident beam 38 will pass through the filter at a wavelength approximating 1.25 microns. Of course, other wavelengths where adequate relative absorption and non-absorption characteristics are present might be relied upon.

The energy passing through the filter either from the pulsed beam 38 or the pulsed beam 40 is directed onto a glass diffuser plate 44, the purpose of which is to spread the radiant energy more uniformly over a lead-sulfide photocell 46, thereby minimizing point-to-point variations in this photocell. The energy detected by the photocell 46 is fed to a suitable amplifier 48 so that a measurable signal is produced which, in the exemplified situation, is recorded by an appropriate recorder 50, such as a recording potentiometer. If no recording is desired, then the recorder might be replaced with a cathode ray oscilloscope or other indicating meter.

Before explaining the operation of the foregoing system, it is felt that a better understanding of both the apparatus and the method used in following the teachings of the invention may better be comprehended by reference to Fig. 3. In this figure, it is to be observed that a typical energy curve 52 for a tungsten filament lamp is presented. The curve 52 is representative of radiant energy plotted against wavelength. Also given in Fig. 3 is an indication of the energy passed by the filter 42 at a 30° angle of incidence, this particular incidence curve being quite small and distinguishable by the reference numeral 54. It might be pointed out, too, that this energy curve 54 has its center or peak at approximately 1.25 microns and at this wavelength there is for all practical purposes little or no attenuation of radiant energy due to whatever moisture is present. However, a companion curve is presented at 1.38 microns. This curve before subtraction for attenuation has been designated by the reference numeral 56, appearing in dotted outline and extending substantially above the curve 54 in peak value. However, in order to appreciate the merits of the invention, it is to be noted that there is a certain amount of energy absorbed by water vapor at this particular wavelength, that is 1.38 microns. This absorption energy curve has been given the reference numeral 58. Thus energy that is actually passed by the filter 42 at a zero degree angle of incidence, that is normal to the plane of the filter, is reduced from the amount indicated by the curve 56, and this reduced amount has been presented as a lesser or hatched curve labelled 60. Hence the curve 60, representative of energy actually passed at a zero degree angle of incidence, is the difference between curve 56 and curve 58.

From the foregoing, it is believed that the method of operating the exemplified apparatus will be manifest. However, having selected the filter 42 so as to provide the proper absorption function, that is a filter having a center of transmission approximating 1.38 microns, the axis of the rotatable mirror 20 is arranged at an angle relative to the beam 16 and also by angling the stationary mirror 36, the proper angle of incidence is obtained which will give a wavelength of approximately 1.25 microns. In this particular instance the angle of incidence has been found to be approximately 30° produced by both the mirrors 20 and 36. Energy from the infra-red light source 10 is then permitted to pass through the collimating device 12 and the collimated beam 16, in turn, is directed through the sample to be analyzed. The beam after passage through the sample then strikes the rotating segments 22 of the mirror 20 and is reflected onto the stationary mirror 36 in the form of pulses or flashes comprising the beam 34. These pulses or flashes then impinge upon the filter 42 in the form of the beam 38 at the set angle of incidence, that is 30° under the conditions assumed. The pulses which are not diverted, indicated by the beam 40, of course, continue in a straight line, being a pulse continuation of the beam 16. In this way, the energy emitted from the source 10 is directed onto the filter 42 at two different angles, and as hereinbefore noted, these two different angles are responsible for passing energy through the filter at particular wavelengths, these wave lengths being 1.38 and 1.25 microns.

After passage through the filter 42 the diffuser is instrumental in spreading the energy over the photocell 46, and the amplifier 48 amplifies these pulses to such an extent that they can be recorded by the recorder 50. At this time it might be pointed out if the motor 32 is rotating at 1800 r.p.m., owing to the employment of two mirror segments 22, the pulses received by the photocell 46 have a fluctuating frequency of 60 cycles per second. The amplifier therefore amplifies not only the unattenuated pulses such as those indicated by the numeral 38, but also the attenuated pulses indicated by the numeral 40. Hence an out-put signal from the amplifier 48 is derived which will be a measure of both sets of pulses, and it is this overall error signal that is recorded by the recorder 50.

Assuming that there is a different amount of moisture entrained in the air sample within the cell structure 18, then, of course, the error signal from the amplifier 48 will have a particular magnitude. However, if there is a change in the humidity of the sample, say an increase in moisture, there will be more attenuation of the energy passed at a wavelength of 1.38 microns but little or no change in the energy passed at 1.25 microns. Therefore, it is believed quite obvious that there will be a decrease in the error signal out-put by the amplifier 48 and this decrease will appear in the quanta recorded by the recorder 50. Consequently, an observer can compare the reading obtained before a change in humidity with the reading obtained after a change and thus he will receive an accurate indication of what the humidity is at any particular moment, once the recording mechanism has been properly calibrated. It should be observed that any change is detected instantaneously without delay.

While only a photocell 46, amplifier 48 and a recorder 50 have been depicted as the means by which the radiant energy passed through the filter 42 is detected, it will, of course, be appreciated that these various components are subject to rather wide modification. For instance, the photocell might be instead, a bolometer or a thermocouple, both of these detectors receiving the radiant energy and utilizing the heat generated therefrom in producing a signal which would be fed to the amplifier. Also, it will be appreciated that any out-put signal from the amplifier need not be recorded immediately but may be fed to a servomotor system which would be responsible for constantly maintaining a balanced or null condition. When using a servomotor system, it is customary to have the servo mechanism change the voltage of the light source 10. When this is done, the lamp temperature is altered and the ratio of radiant energy emitted by the source at both the reference and absorption wavelengths changes. An indication of a change in the temperature of the source 10 may be obtained by use of a meter in the circuit of the source or preferably by measuring the total radiation of the source direct. Since the employment of a servomotor arrangement forms no part of the instant invention, being only an adjunct thereto, it is not deemed necessary to present or describe a servo system.

Thus it will be seen that the system and method described above are exceedingly simple and that the apparatus is very inexpensive as far as practical realization is concerned. At the same time, however, the method and system are both exceptionally reliable and because of the fast action thereof, will find especial utility in hygrometry measurements. Also, as pointed out hereinbefore, the method and system will have more widespread utility inasmuch as the invention may be practiced wherever a fluid medium is to be analyzed which has a characteristic or property capable of attenuating a beam or radiant energy at least one particular frequency or wavelength.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed:

1. An absorption spectrometer comprising a radiant energy source capable of emitting a beam within a desired spectrum for transmission through a fluid medium to be analyzed, radiant energy detecting means spaced relative to said source for detecting energy passed through said medium, a stationary light transmission filter, reflecting means including a movable reflector disposed at an angle to said beam and a second reflector stationed laterally from said movable reflector, and means for moving said movable reflector into and out of the path of said beam so that said beam is alternately directed onto said filter at different angles via two separate paths, at least a portion of one of said paths being between said movable reflector and said second reflector.

2. An absorption spectrometer comprising a radiant energy source capable of emitting a beam within a desired spectrum for transmission through a fluid medium to be analyzed, radiant energy detecting means spaced relative to said source for detecting energy passed through said medium, a multi-layer light transmission filter positioned between said energy source and said detecting means, and reflecting means including a rotatable segmented mirror for alternately reflecting and passing said beam so that it strikes said filter at different successive angles.

3. An absorption spectrometer comprising a radiant energy source capable of emitting a beam within a desired spectrum for transmission through a fluid medium to be analyzed, radiant energy detecting means spaced relative to said source for detecting energy passed through said medium, a multi-layer light transmission filter positioned between said energy source and said detecting means, a mirror having a pair of oppositely disposed reflecting segments leaving angular spaces therebetween, means for rotating said mirror on an axis at an angle to said beam, and a stationary mirror arranged to receive beam flashes reflected from the moving segments of the rotatable mirror and to reflect said flashes onto said filter at an angle less than 90° with respect to the plane thereof, the spaces between the mirror segments permitting the unreflected beam flashes to strike said filter at substantially 90° with respect to its plane.

References Cited in the file of this patent

UNITED STATES PATENTS

| | | |
|---|---|---|
| 2,462,946 | Coggeshall et al. | Mar. 1, 1949 |
| 2,683,220 | Gross | July 6, 1954 |
| 2,737,591 | Wright et al. | Mar. 6, 1956 |
| 2,834,246 | Foskett et al. | May 13, 1958 |

FOREIGN PATENTS

| | | |
|---|---|---|
| 727,410 | Great Britain | Mar. 30, 1955 |

OTHER REFERENCES

Some Considerations in the Design of Double-Beam Analyzers for Industrial Control, by Gilbert Kivenson, from Journal of the Optical Society of America, vol. 40, No. 2, February 1950, pages 112–118.